Patented Nov. 5, 1940

2,220,114

UNITED STATES PATENT OFFICE 2,220,114

METHOD FOR ISOLATING CHOLESTEROL

Samuel Natelson and Albert E. Sobel, Brooklyn, and Isaac J. Drekter, Woodside, N. Y.

No Drawing. Application February 5, 1936, Serial No. 62,432

24 Claims. (Cl. 260—397)

Our invention relates to the isolation and separation from impurities of organic cyclic compounds with a hydroxyl group attached to the cyclic nucleus, such as cholesterol, ergosterol, isocholesterol, phytosterols, borneol, homologues and isomers of cholesterol, eugenol, and vanillin.

Heretofore, the most common sources for the isolation of cholesterol have been spinal cords and brain tissue because the process of extraction by solvents and crystallization was relatively simple in that no impurities occurred which interfered with the process of crystallization. The disadvantages of these sources is that they are, first, expensive and secondly, the amount of cholesterol in these sources is not greater than that which can be obtained from more common sources, such as lanolin and fish liver oils.

For a long time it was known that sources such as lanolin and fish liver oils contained large quantities of cholesterol but the method of extraction by solvents was ineffectual in that the impurities made crystallization difficult.

We have discovered an inexpensive method for the separation of organic cyclic compounds containing a hydroxyl group attached to the nucleus from their naturally occurring sources or from impurities. This method isolates the material quantitatively and at the same time in a highly purified state.

The method depends upon the reaction between organic cyclic compounds containing a hydroxyl group attached to the nucleus and salts of sulphuric, chlorosulfonic or phosphoric acid to form salts of organic esters such as sulfates or phosphates. Inasmuch as one end of the acid is esterified with the hydroxyl group of the cyclic organic compound and a second acid hydrogen forms a salt with a tertiary amine or is replaced as shown below by an alkali; the esters of the organic compounds must be of acids which are at least dibasic such as sulfuric, phosphoric or boric acids The impurities are then washed out by solvents in which the salts of the organic sulfates are insoluble The organic cyclic compounds containing the hydroxyl group are then regenerated either by boiling in water, mineral or organic acids or pure or dilute methyl or ethyl alcohol The compounds regenerated are found in most cases to be of higher purity than can be attained through distillation or recrystallization.

One way of preparing the reagent is to add sulfuric acid, chlorosulfonic acid or phosphoric acid to a solution of a tertiary amine such as pyridine, picolines, quinolin, dimethyl aniline, trialkyl amines (as represented by trimethyl amine) in chloroform, benzene, carbon tetrachloride, ethylene dichloride, petroleum ether or similar non-reactive solvents, keeping the solution cool. The salts of sulfuric acid, chlorosulfonic acid or phosphoric acid precipitate out and may be filtered off and washed with petroleum ether. This preparation may be represented by the following equation, using pyridine as an example:

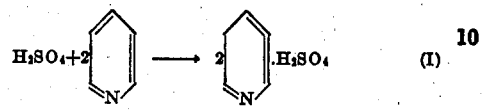

(I)

The reagent, pyridine or the sulfate of any of the tertiary amines mentioned above, is stable and may be kept so prepared for months in a stoppered bottle without any change in its activity. The reagent need not be completely washed of the tertiary amine for its subsequent use.

The tertiary amine salt of the sulfuric acid is then added to the material containing a cyclic organic compound or compounds with a hydroxyl group attached to the nucleus, such as cholesterol, ergosterol, phytosterols, isocholesterol, oxycholesterol, borneol, eugenol, or vanillin. If tertiary amine sulfates or phosphates are used, sufficient acetic anhydride or glacial acetic acid may be added to act as dehydrating agents in order to complete the reaction and to adjust the acidity so as to favor the completion of the reaction. If tertiary amine chlorsulfonates are used this is not necessary. Sufficient tertiary amine or alkaline reacting salt such as sodium acetate may be used to neutralize excess acidity of the reaction mixture. This reaction is best carried out under anhydrous conditions and if any moisture is present dehydrating agents may be added. The reaction may be carried out with fuming sulfuric acid, sulfur trioxide (SO₃) or phosphorus pentoxide (P₂O₅) in place of using the dehydrating agents. Acetic acid and acetic anhydride also serve to make the reaction mixture more homogeneous. Benzol may also be added at this point to make the reaction more homogeneous. The reaction goes to completion at room temperature but may be hastened by mild heating. At approximately 45° C. the reaction is complete in from five minutes to one hour depending upon the speed of mixing. The reaction may be represented by the following equation:

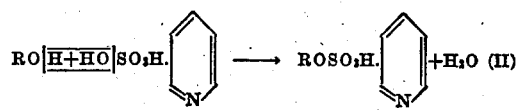

(II)

in which R represents the cyclic organic residue to which the hydroxyl group is attached.

The tertiary amine salts of sterol sulfates are excellent emulsifying agents and act themselves like soaps and, therefore, are useful as an emulsifying agent in polishes, cleaners, creams, etc.

A solvent is then added to precipitate the sulfate and dissolve out the impurities. Petroleum ether, kerosene, ligroin, benzine, varnolene, naphtha, benzol and toluol are examples of suitable solvents.

The precipitated pyridine sulfate salt of the organic compound containing the hydroxyl group is separated as by filtering or by centrifuging. The residue now consists of pyridine cholesterol sulphate, excess of pyridine sulfate or chlorsulfonate, and if chlorosulfonic acid was used, pyridine hydrochloride. The desired cholesterol is then recovered by decomposing the residue by either stirring or heating with water, steam, dilute mineral acids, organic acids or heating with pure or dilute methyl alcohol or ethyl alcohol or with organic acids dissolved in ethyl or methyl alcohol. The mineral acids which may be employed for the decomposition include sulphuric, hydrochloric, phosphoric, boric acid, acid salts, such as sodium acid sulphate, sodium dihydrogen phosphate. The organic acids which may be employed for this decomposition include tartaric acid, lactic acid, acetic acid, and oxalic acid.

If too high a temperature is used for the decomposition, dehydration of the organic compound may occur in certain cases; for example, pyridine cholesteryl sulphate, or potassium cholesteryl sulphate described below, when heated in a sealed tube at 110° C. for two hours gave quantitative yields of cholesterylene; similarly, potassium ergosteryl sulphate yields ergosterylene. In one case of decomposition we were able to isolate a quantitative yield of cholesterol from pyridine cholesteryl sulphate or potassium cholesteryl sulphate by boiling or stirring the substance with water to which sufficient sulfuric acid had been added to make it acid to litmus.

After the cholesterol has been recovered, the residual base, such as pyridine, is recovered from the decomposed mixture.

An alternative method which has some advantages in ease of handling and in the recovery of the residue is to add a dilute solution of alkali, such as sodium, potassium, calcium or barium hydroxide to convert the tertiary amine salt to the alkali salt.

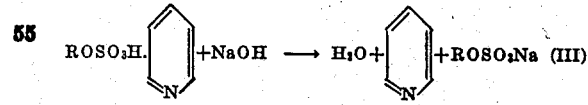

The amine base may then be steam distilled off or filtered off, leaving the alkali cholesteryl sulphate (ROSO$_3$Na) as a residue, the other materials being dissolved in water. The sodium salt is then decomposed in the manner described above in connection with the pyridine salt.

Cholesterol may be converted to the sodium or potassium salt of cholesteryl sulfate by treatment directly with potassium acid sulfate in the presence of a dehydrating agent. Acetic anhydride or glacial acetic acid or sulphur trioxide (SO$_3$) may act in this capacity. Potassium pyrosulfate is also useful in the same manner. The reaction is shown below.

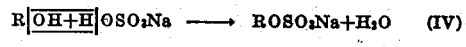

It is apparent that salts of acids where one hydrogen is free may be readily used in a similar capacity. For example, potassium acid sulfate, sodium acid sulfate, potassium dihydrogen phosphate and sodium dihydrogen phosphate are useful in this capacity. A tertiary amine added to the original cholesterol mixture assists this reaction in going to completion.

The procedure has been found to be especially valuable when applied to the isolation of sterols from natural sources. Cholesterol and its isomers and homologues may be thus efficiently separated from lanolin, fish liver oils, spinal cords, brain tissue and blood. By either of the methods described above, these inexpensive sources may be used as raw materials for the preparation of cholesterol which can then find use as a base for face creams, for therapeutic purposes and as a raw material for the preparation of numerous important compounds such as the sex hormones.

We have also been able to separate ergosterol by our novel methods from plant sources such as yeast. Up to the present the cost of ergosterol has been very high, partly due to difficulties in separation. Since this substance is a raw material for the preparation of calciferol or "artificial Vitamin D," its importance is apparent. Tertiary amine ergosteryl sulfates and the alkali salts of ergosteryl sulfate emulsify to varying degrees in water. On irradiation they become antirachitically active and hence may be useful for making water emulsions of an antirachitic vitamin.

Plant sterols (phytosterols) such as sitosterol and stigmasterol have been efficiently separated from plant sources by this procedure.

The relative solubility of the salts of sterol sulfates are different in different solvents and by a suitable choice of solvents separations have been made between different sterols. For example, the sterols of lanolin, although mostly cholesterol, do contain other sterols such as isocholesterol, oxycholesterol and other less known sterols. By suitable choice of mixtures of ether and alcohol or ether and petroleum ether, these sterols can be separated because of their different solubilities. Pyridine ergosteryl sulfate can readily be separated from pyridine cholesteryl sulfate because of its lesser solubility in pure anhydrous ether. This is of scientific importance in determining whether the provitamin in cholesterol is ergosterol.

The sex hormones, follicular, pregnancy and testicular hormones, behave in a similar manner as the sterols and such compounds as androsterone, progestin and oestrin have been easily isolated from the usual sources such as urine concentrates, extracts of testes and extracts of ovaries.

The method when applied to borneol was efficient in separating borneol from camphor or impurities which do not react with the reagent. Potassium and sodium bornyl sulfate are water soluble and valuable as mild antiseptics. Borneol is insoluble in water and these salts keep the valuable therapeutic properties of borneol in addition to being water soluble. The value of camphor as a plasticizer of cellulose esters is increased if the last traces of borneol are removed.

Valuable phenols such as eugenol could be quantitatively separated from clove oil and vanillin from vanilla pod extracts.

Details as to the isolation of these materials are given in the following examples:

*Example I.*—1000 grams of the crude non-saponifiable fraction of lanolin was dissolved with 1000 c. c. of benzol. To this solution was added 320 grams of pyridine dissolved in 300 c. c. of acetic anhydride To this solution, well shaken, was added 400 grams of pyridine sulfate prepared as described above. The amount of reagent added depends upon the amount of cholesterol in the original sample of lanolin. At this point a large amount of pyridine cholesteryl sulfate rapidly precipitated. The mixture was then heated at 45°–47° C. in an electric oven for from 5 minutes to 1 hour with constant stirring and then cooled to 0° C. To the mixture, with vigorous stirring, was then added from one to two liters of cold petroleum ether (B. P. 35°–60° C.) and the mixture was allowed to stand until the precipitated pyridine cholesteryl sulfate had separated completely. In this precipitate is also found an excess of pyridine sulfate. The precipitate was filtered or centrifuged from the supernatant fluid and washed free of impurities with about an additional two liters of cold petroleum ether. The precipitate was then made just neutral with sulfuric acid and heated with 3 liters of water at 100° C. The pure cholesterol was centrifuged off, washed with water and dried. Alternatively steam may be passed into the precipitate and the decomposition can be completed in a similar fashion.

The yields are so quantitative, that the above procedure is now used as a method for determining the percentage of cholesterol in an unknown sample. The lanolin need not be saponified before treatment with this reagent nor need the saponified fraction be separated before treatment. However, in order to decrease the bulk of the material handled and since the soaps formed in saponification are valuable as by-products, treatment of the non-saponifiable fraction may prove to be most efficacious.

*Example II.*—1000 grams of the dried non-saponifiable fraction of lanolin was mixed with 160 grams of pyridine. To this mixture was added 400 grams of pyridine sulfate and the mixture was warmed to 40°–60° C. for 15 minutes to one hour with vigorous stirring. The mixture was then extracted with cold petroleum ether and the residue hydrolyzed to yield cholesterol by stirring in 2 liters of water to which 2% of sulfuric acid had been added. The cholesterol may be centrifuged off.

*Example III.*—To 1000 grams of the non-saponifiable fraction of lanolin dissolved in 3 liters of petroleum ether (B. P. 45°–80° C.) was added 400 grams of pyridine sulfate. The solution was then refluxed for from 15 minutes to one hour. The solution was cooled to 0° C. and the precipitated pyridine cholesteryl sulfate was filtered off. The filtrate was washed with petroleum ether and the cholesterol freed by boiling in 3 liters of water containing 2% of hydrochloric acid.

*Example IV.*—To 1000 grams of the non-saponifiable fraction of lanolin dissolved in 3 liters of petroleum ether (B. P. 45°–80° C.) was added 400 grams of pyridine sulfate and 100 c. c. of acetic anhydride. The solution was then refluxed for from 15 minutes to one hour. The solution was cooled to 0° C. and the precipitated pyridine cholesteryl sulfate was filtered off. The filtrate was washed with petroleum ether and the cholesterol freed by boiling in 3 liters of water containing 10% of acetic acid.

*Example V.*—To 1000 grams of the non-saponifiable fraction of lanolin dissolved in 3 liters of petroleum ether (B. P. 45°–80° C.) was added 400 grams of pyridine sulfate and 100 c. c. of pyridine. The solution was then refluxed for from 15 minutes to one hour. The solution was cooled to 0° C. and the precipitated pyridine cholesteryl sulfate was filtered off. The filtrate was washed with petroleum ether and the cholesterol freed by boiling in 3 liters of water containing 2% of phosphoric acid.

*Example VI.*—To 1000 grams of the non-saponifiable fraction of lanoline was added 190 grams of pyridine and 3 liters of petroleum ether. To this mixture cooled in an ice bath was added drop by drop 200 grams of sulfuric acid with vigorous stirring. The reaction mixture was then heated to 45°–47° C. for from 15 minutes to 45 minutes and then cooled to 0° C. The precipitated pyridine cholesteryl sulfate was filtered off and washed with petroleum ether. The precipitate was boiled in water (2 liters) containing about 2% sulfuric acid for from 15 minutes to one hour. The freed cholesterol was filtered off and washed with water. It was then made slightly alkaline to litmus paper with a small amount of dilute sodium hydroxide solution and steam distilled to remove the last traces and odor of pyridine.

*Example VII.*—To 1000 grams of the non-saponifiable fraction of lanolin dissolved in 3 liters of petroleum ether (B. P. 45°–80° C.), the whole solution dried over anhydrous calcium chloride, was added 400 grams of pyridine sulfate. The solution was then refluxed for from 15 minutes to one hour. The solution was cooled to 0° C. and the precipitated pyridine cholesteryl sulfate was filtered off. The filtrate was washed with petroleum ether and the cholesterol freed by boiling in 3 liters of water containing 10% of acetic acid.

*Example VIII.*—1000 grams of the crude non-saponifiable fraction of lanolin was dissolved in 1000 c. c. of benzol. To this solution was added 320 grams of pyridine dissolved in 300 c. c. of glacial acetic acid. To this solution, well shaken, was added 400 grams of pyridine sulfate prepared as described above. The amount of reagent added depends upon the amount of cholesterol in the original sample of lanolin. At this point a large amount of pyridine sulfate rapidly precipitated. The mixture was then heated at 45°–47° C. in an electric oven for from 5 minutes to 1 hour with constant stirring and then cooled to 0° C. To the mixture, with vigorous stirring, was then added from one to two liters of cold petroleum ether (B. P. 35°–60° C.) and the mixture was allowed to stand until the precipitated pyridine cholesteryl sulfate had separated completely. In this precipitate was also found an excess of pyridine sulfate. The precipitate was filtered or centrifuged from the supernatant fluid and washed free of impurities with about an additional two liters of cold petroleum ether. The precipitate was then made just neutral with acetic acid and heated with 3 liters of water at 100° C. The pure cholesterol was filtered off, washed with water and dried. Alternatively steam may be passed into the precipitate and the decomposition can be completed in a similar fashion.

*Example IX.*—To 1000 grams of the non-saponifiable fraction of lanolin was added 600 grams of dimethyl aniline. 1000 grams of benzol were then added and to the vigorously stirred and cooled solution was then added 200 grams of sulfuric acid drop by drop. The mixture was then heated to 45° C. for about 30 minutes to complete the reaction. The mixture was then cooled and the impurities were removed by extraction with petroleum ether. The residue was then hydrolyzed by means of 3 liters of a 2% aqueous solution of phosphoric acid. The cholesterol was then extracted with benzol, the benzol was evaporated off and the last traces of dimethyl aniline were removed by steam distillation.

*Example X.*—A crude mixture of picolines was dissolved in chloroform and sufficient sulfuric acid was added to precipitate all the bases as the sulfate salts. The mixture of salts was filtered off and used in place of pyridine sulfate in Examples I to VIII inclusive.

*Example XI.*—Cold chloroform was saturated with trimethyl amine and sulfuric acid was added drop by drop with stirring until precipitation was almost complete. A slight excess of the amine was allowed to remain in the chloroform solution. The precipitated trimethyl amine was used in place of pyridine sulfate in Examples I to VIII inclusive.

*Example XII.*—400 grams of pyridine was dissolved in 400 c. c. of chloroform or carbon tetrachloride. To this solution, cooled in an ice and salt bath, was added 232 grams of sulfuric acid. The precipitated salt was filtered cold and washed with cold petroleum ether. The salt as prepared in this manner was stable and may be used in Examples I to VIII inclusive.

*Example XIII.*—The tertiary amine cholesteryl salts as prepared in Examples I to IX inclusive are treated with an excess of 10% either sodium or potassium hydroxide with vigorous shaking. The conversion to the alkali salts needs vigorous stirring for rapid conversion. The alkali salts of cholesteryl sulfate are then filtered off and washed with cold water to free of adhering salts. The alkali cholesteryl sulfates may be so stored indefinitely. For regeneration of the free cholesterol the desired salt may be boiled or stirred in mineral or organic acid such as 2% aqueous solutions of sulfuric, phosphoric, hydrochloric, lactic, acetic or tartaric acid. Alcoholic solutions or suspensions of the organic acids mentioned, when refluxed for about one to three hours will give complete hydrolysis.

*Example XIV.*—Ergosterol containing yeast was thoroughly ground and mashed with sand in a mortar and extracted repeatedly with warm alcohol. The extract was then treated as for the isolation of cholesterol in Examples I to VIII and XIII. An alternative procedure is to saponify the sterol extract and then isolate the ergosterol from the non-saponifiable fraction.

*Example XV.*—1000 grams of cod liver oil or its non-saponifiable fraction is treated as in Example I. The percentage of cholesterol is smaller and hence the amount of reagent is proportionately reduced with the exception of the petroleum ether.

*Example XVI.*—Brain tissue or spinal cords of animals such as cattle, sheep or pigs were thoroughly ground with sand and the material was then extracted repeatedly with hot alcohol. The alcoholic extract was then saponified and the non-saponifiable fraction was treated as in Example I to isolate a mixture of sterols of which more than 90% was cholesterol.

*Example XVII.*—Commercial crude cholesterol was treated as in Example I to yield pure cholesterol in quantitative yield.

*Example XVIII.*—5 grams of ergosterol was irradiated for 1 hour with a mercury vapor lamp at a distance of 1 foot. The mixture of sterols formed was then treated as in Example XIII to remove unreacted ergosterol. The ergosterol was freed from ergosteryl potassium sulfate by refluxing for one hour with 70% methyl alcohol to avoid rearrangement of the ergosterol when freed from the salt.

*Example XIX.*—A mixture containing 50% borneol and 50% camphor was treated as in Example XIII. The potassium bornyl sulfate was then steam distilled, the pure borneol coming off in the steam distillate.

*Example XX.*—1 liter of clove oil was treated as in Example III to yield potassium eugenol sulfate. The eugenol was then isolated from the salt by steam distillation.

*Example XXI.*—Oil from the vanilla pod was treated as in Example I. The pyridine vanillin sulfate salt was converted to the calcium or barium salt with a saturated solution of calcium or barium hydroxide and filtered off and washed with water. From this salt the vanillin was steam distilled.

*Example XXII.*—Testes of male sheep were thoroughly ground with sand and extracted with alcohol by continuous extraction. The alcohol extract was dried with anhydrous sodium sulfate and the alcohol solution was filtered and evaporated to dryness. The residue was treated as in Example I. On hydrolysis of the pyridine salt an extract was obtained which had the properties of the testicular hormone on immature rats.

*Example XXIII.*—Urine from a pregnant mare was evaporated to dryness and treated as in Example XXII to isolate a mixture of substances which had hormone-like properties.

*Example XXIV.*—The ovaries of a mature rabbit were thoroughly ground and treated as for the extract of the testes in Example XXII to isolate substances which had the properties of the ovarian hormones on immature mice.

*Example XXV.*—Cholesteryl pyridine sulfate prepared as in Example I or ergosteryl pyridine sulfate prepared as in Example I was mixed with twice its volume of water to which sufficient sulfuric acid was added to make the solution just acid to litmus. The solution was then stirred for about ½ to 2 hours at room temperature. The sterol was separated by centrifuging or extracting with ether. In this manner dangers of isomerization of small amounts of the sterols are removed.

*Example XXVI.*—1000 grams of the non-saponifiable fraction of lanolin were dissolved in 1 liter of benzol. To this solution with cooling was added about 700 c. c. of pyridine or an equivalent amount of any of the other tertiary amine bases mentioned above. To this solution was then added 172 grams of $SO_3$ (sulphur trioxide) or 372 grams of commercial fuming sulfuric acid or 232 grams of chlorosulfonic acid, keeping the mixture at about 10° C. with constant vigorous stirring. The mixture was then stirred at room temperature for about one hour. The tertiary amine cholesteryl sulfate mixed with excess salt of the reagent used was filtered off and washed with benzol. The residue was then decomposed by making slightly acid to litmus with sulfuric acid and refluxing for about one hour. The colloidal cholesterol liberated from the pyridine cholesteryl sulfate remained suspended and was centrifuged and re-suspended in water by adding fresh water. If crystallized from alcohol the characteristic plates of cholesterol are formed.

*Example XXVII.*—1000 grams of the non-saponifiable fraction of lanolin were dissolved in twice its volume of benzol. 300 c. c. of pyridine and 300 c. c. of acetic anhydride were added.

To this solution was then added 300 grams of dry powdered sodium acid sulfate. The mixture was stirred vigorously and warmed to 46° C. for about one hour. The precipitated sodium cholesteryl sulfate was filtered from the mixture and washed with benzol. The salt was then decomposed to liberate the cholesterol by warming in dilute sulfuric acid.

Although for purposes of illustrating our invention we have described extraction of cholesterol, it will be clear to those skilled in the art that the principle involved may also be employed for the isolation of ergosterol and the like. Also although in illustrating the invention we have described isolations of cholesterol from lanolin and cod liver oil, it will be clear that this process of separation may be employed generally where cholesterol may be quantitatively isolated and we therefore do not intend to be limited except by the following claims.

We claim:

1. The steps in the isolation of ergosterol from other organic substances which comprises converting the sterol to a tertiary amine salt of the mono-ester of sulphuric acid and precipitating the salt so formed by the addition of a medium which is non-solvent for the sterol salt but which is solvent for substantially all of the remaining impurities.

2. The steps in the process of isolating cholesterol from other organic substances which comprises adding a tertiary amine to the mixture of cholesterol and other organic substances, adding sulfur trioxide to form a tertiary amine salt of cholesteryl sulfate and precipitating the tertiary amine salt of cholesteryl sulfate by means of a medium that is non-solvent for the pyridine salt of cholesterol and solvent for substantially all remaining components.

3. The steps in the process of isolating cholesterol from other organic substances which comprises adding a tertiary amine to the mixture of cholesterol and other organic substances, adding fuming sulfuric acid to form a tertiary amine salt of cholesteryl sulfate and precipitating the tertiary amine salt of cholesteryl sulfate by means of a medium that is non-solvent for the pyridine salt of cholesterol and solvent for substantially all remaining components.

4. The method of isolating cholesterol from lanolin which comprises dissolving the non-saponifiable fraction of lanolin in a non-reactive solvent, adding a solution of acetic anhydride with pyridine, adding pyridine sulfate to precipitate the cholesterol from the mixture as pyridine cholesteryl sulfate, completing the reaction by heating, separating the precipitated pyridine cholesteryl sulfate from the mixture, and decomposing to free the cholesterol.

5. The method of isolating cholesterol from lanolin which comprises dissolving the non-saponifiable fraction of lanolin in a non-reactive solvent, adding a solution of acetic anhydride with pyridine, adding pyridine sulfate to precipitate the cholesterol from the mixture as pyridine cholesteryl sulfate, completing the reaction by heating, separating the precipitated pyridine cholesteryl sulfate from the mixture, and decomposing the precipitate with dilute mineral acid.

6. The steps in the isolation of ergosterol from other organic substances which comprises adding a tertiary amine salt of an acid that is at least dibasic to the organic substance containing the ergosterol to convert the ergosterol to a tertiary amine salt of the ergosterol ester and precipitating the ergosterol ester as an insoluble salt of one of the free acid hydrogens by adding a medium which is non-solvent for the salt of the ergosterol ester and which will dissolve substantially all of the remaining impurities.

7. The steps in the isolation of ergosterol from other organic substances which comprises converting the ergosterol to an ester of an inorganic acid which is at least dibasic and precipitating the ergosterol ester as an insoluble tertiary amine salt of one of the free acid hydrogens by adding a medium which is non-solvent for the tertiary amine salt of the ergosterol ester and which will dissolve substantially all of the remaining impurities.

8. The method of isolating sterols from other organic substances which comprises converting the sterol to a pyridine salt of its sulfate ester in the presence of sulfur trioxide and pyridine, dissolving the impurities and leaving the pyridine sterol sulfate behind as a precipitate by adding a medium which is non-solvent for the pyridine sterol sulfate but which is solvent for substantially all of the remaining impurities.

9. The method of isolating sterols from other organic substances which comprises treating the mixture with a tertiary amine salt of an acid which has at least one free acidic hydrogen in the presence of a dehydrating agent at a temperature of the order of 45° C. to form a salt of an ester of the sterol and precipitating the salt by adding a medium which is non-solvent for the sterol salt but which is solvent for substantially all of the remaining impurities.

10. The method of isolating sterols from other organic substances which comprises treating the mixture with a tertiary amine salt of sulfuric acid to form a precipitated tertiary amine salt of the sulfate ester of the sterol by adding a medium which is non-solvent for the amine salt of the sulfate ester of the sterol but which is solvent for substantially all of the remaining impurities.

11. The method of isolating sterols from other organic substances which comprises treating the mixture with a pyridine salt of sulfuric acid to form a pyridine sulfate salt of the sterol and precipitating the salt so formed to separate it from the other organic substances by adding a medium which is non-solvent for the pyridine salt of the sterol but which is solvent for substantially all of the remaining impurities.

12. The method of isolating sterols from other organic substances which comprises treating the mixture with a tertiary amine salt of sulfuric acid to form a precipitated tertiary amine salt of the sulfate ester of the sterol by adding a medium which is non-solvent for the tertiary amine salt of the sulfate ester of the sterol but which is solvent for substantially all of the remaining impurities and adding an alkali to convert the tertiary amine salt of the sulfate ester to an alkali salt.

13. The steps in the isolation of sterols from other organic substances which comprises adding a tertiary amine salt of an inorganic acid that is at least dibasic to the organic substance containing the sterol to form the tertiary amine salt of the sterol ester and precipitating the tertiary amine salt of the sterol ester by adding a medium which is non-solvent for the tertiary amine salt of the sterol ester but which is solvent for substantially all of the remaining impurities.

14. The steps in the isolation of sterols from other organic substances which comprises adding a tertiary amine salt of an inorganic acid that is at least dibasic to the organic substance containing the sterol to form the tertiary amine salt of the sterol ester; separating out the salt by the addition of a medium which is non-solvent for the tertiary amine salt of the sterol ester and solvent for substantially all of the remaining impurities; and converting the insoluble tertiary amine salt to a more insoluble metal salt.

15. The steps in the isolation of sterols from other organic substances which comprises adding a tertiary amine salt of an inorganic acid that is at least dibasic to the organic substance containing the sterol under anhydrous conditions to form the tertiary amine salt of the sterol ester; separating out the salt by the addition of a medium which is non-solvent for the tertiary amine salt of the sterol ester but which is solvent for substantially all of the remaining impurities; and converting the insoluble tertiary amine salt to a more insoluble metal salt.

16. The steps in the isolation of sterols from other organic substances which comprises adding a tertiary amine salt of an inorganic acid that is at least dibasic to the organic substance containing the sterol; adding a dehydrating agent to achieve anhydrous conditions; precipitating the tertiary amine salt of the sterol ester by adding a medium which is non-solvent for the tertiary amine salt but which is solvent for substantially all of the remaining impurities; separating out the insoluble salt of the sterol ester; and converting the insoluble tertiary amine salt of the sterol ester to a more insoluble metal salt.

17. The steps in the isolation of sterols from the grease obtained from sheep's wool which comprises saponifying the grease obtained from sheep's wool; separating out the non-saponifiable fraction; treating this non-saponifiable fraction with a tertiary amine salt of an inorganic acid which is at least dibasic; precipitating the tertiary amine salt of the sterol ester by adding a medium which is non-solvent for the tertiary amine salt but which is solvent for substantially all of the remaining impurities; separating out the insoluble tertiary amine salt of the sterol ester; and decomposing the insoluble amine salt of the sterol ester to obtain the sterol.

18. The steps in the isolation of sterols from the grease obtained from sheep's wool which comprises saponifying the grease obtained from sheep's wool; separating out the non-saponifiable fraction; treating this non-saponifiable fraction with a tertiary amine salt of an inorganic acid which is at least dibasic; precipitating the tertiary amine salt of the sterol ester by adding a medium which is non-solvent for the tertiary amine salt of the sterol ester but which is solvent for substantially all of the remaining impurities; and separating out the insoluble tertiary amine salt of the sterol ester.

19. The steps in the isolation of the sterols from the grease obtained from sheep's wool which comprises saponifying the grease obtained from sheep's wool; separating out the non-saponifiable fraction; treating this non-saponifiable fraction under anhydrous conditions with a tertiary amine salt of an inorganic acid which is at least dibasic; precipitating the tertiary amine salt of the sterol ester by the addition of a medium which is non-solvent for the tertiary amine salt of the sterol ester but which is solvent for substantially all of the remaining impurities; separating out the insoluble tertiary amine salt; and decomposing the insoluble tertiary amine salt of the sterol ester to obtain the sterol.

20. The steps in the isolation of sterols from the grease obtained from sheep's wool which comprises saponifying the grease obtained from sheep's wool; separating out the non-saponifiable fraction; treating this non-saponifiable fraction under anhydrous conditions with a tertiary amine salt of an inorganic acid which is at least dibasic in the presence of a solvent medium which is non-solvent for the thus formed amine salt of the sterol ester but which is solvent for substantially all of the remaining impurities, and mechanically separating the liquid impurities from the precipitated amine salt of the sterol ester.

21. The steps in the isolation of sterols which comprise forming a tertiary amine salt of a sterol ester in the presence of a solvent medium which is non-solvent for the amine salt of the sterol ester but which is solvent for substantially all of the remaining impurities, and mechanically separating the liquid impurities from the precipitated tertiary amine salt of the sterol ester.

22. The steps in the isolation of nuclear hydroxy cyclic compounds from other organic substances which comprise adding a tertiary amine salt of an inorganic acid that is at least dibasic to the organic substance containing the nuclear hydroxy cyclic compound to form the tertiary amine salt of the nuclear hydroxy cyclic ester and separating the tertiary amine salt of the nuclear hydroxy cyclic ester from the remainder of the components of the mix.

23. The steps in the isolation of nuclear hydroxy cyclic compounds from other organic substances which comprise adding a tertiary amine salt of an inorganic acid that is at least dibasic to the organic substance containing the nuclear hydroxy cyclic compound to form the tertiary amine salt of the nuclear hydroxy cyclic ester, in the presence of a medium which is non-solvent for the tertiary amine salt of the nuclear hydroxy cyclic compound but which is solvent for substantially all of the remaining impurities so that the tertiary amine salt of the nuclear hydroxy cyclic ester precipitates out of the mixture, and separating the tertiary amine salt of the nuclear hydroxy cyclic ester from the remainder of the components of the mix.

24. The steps in the isolation of nuclear hydroxy cyclic compounds from other organic substances which comprise adding a tertiary amine salt of an inorganic acid that is at least dibasic to the organic substance containing the nuclear hydroxy cyclic compound to form the tertiary amine salt of the nuclear hydroxy cyclic ester and precipitating the tertiary amine salt of the nuclear hydroxy cyclic ester by adding a medium which is non-solvent for the tertiary amine salt of the nuclear hydyroxy cyclic ester but which is solvent for substantially all of the remaining impurities.

SAMUEL NATELSON.
ALBERT E. SOBEL.
ISAAC J. DREKTER.